United States Patent [19]

Hjelmquist

[11] 3,900,208

[45] Aug. 19, 1975

[54] SLEDS
[76] Inventor: Stig Gunnar Hjelmquist, Norraby, Tranas, Sweden
[22] Filed: Mar. 16, 1973
[21] Appl. No.: 341,822

[30] Foreign Application Priority Data
   Mar. 17, 1972   Sweden .............................. 3467/72

[52] U.S. Cl. ................................ 280/16; 280/21 R
[51] Int. Cl. .............................................. B62b 5/00
[58] Field of Search ......... 280/16, 21 R; 188/8, 128

[56]         References Cited
           UNITED STATES PATENTS
3,145,030   8/1964   Millis .................................... 280/16
3,545,785  12/1970   Brenter ........................... 280/21 XR
3,561,783   2/1971   Ellett ................................... 280/16
3,635,497   1/1972   Porsche .............................. 280/16

*Primary Examiner*—Philip Goodman
*Assistant Examiner*—Michael J. Forman
*Attorney, Agent, or Firm*—Browne, Beveridge, DeGrandi & Kline

[57]           ABSTRACT

A sled having a frame, a platform mounted thereon, at least one front runner, at least one rear runner and a steering wheel or like member for pivoting the front runner in relation to the sled frame to which the rear runner or runners are attached. The mechanism for pivoting or steering the front runner incorporates spring means so arranged that with non-loaded sled and non-actuated steering wheel it tends to cause the front runner to take an angular position with respect to the rear runner or runners. Moreover, the pivotally arranged front runner is so mounted to the sled frame that when turned from its straight forward directed position the runner will be set obliquely to the horizontal plane in which the sliding surface of the rear runner or runners is situated.

7 Claims, 4 Drawing Figures 3,900,208

SLEDS

This invention relates to a sled comprising a frame, a platform mounted thereon, at least one sliding plane in the form of one or more runners, skis and the like, fixed in relation to the frame of the sled, and at least one sliding plane in the form of one or more runners, skis and the like pivotally mounted to the frame of the sled, said latter sliding plane serving to steer the sled.

Dangerous situations often arise when children go coasting on sleds and one of the children falls of its sled which is then apt to continue downhill in an uncontrolled manner, colliding with other children and their sleds. With sleds of the so-called saucer model there is a relatively small risk that more serious injuries will arise, but with heavier sleds substantially of metal a collision might involve great risks of injuries.

This invention has for its main object to provide a sled having a device which in a simple manner eliminates the risk that a sled which has lost its rider will continue its travel downhill in an uncontrolled manner.

According to the invention, the pivotally arranged sliding plane is thus provided with means which with unloaded sled and/or unactuated steering wheel tends to adjust the sliding plane in an angular position to the longitudinal direction of the fixed sliding plane.

A preferred embodiment of the invention will be more fully described hereinbelow with reference to the accompanying drawing, in which.

Figure 1:
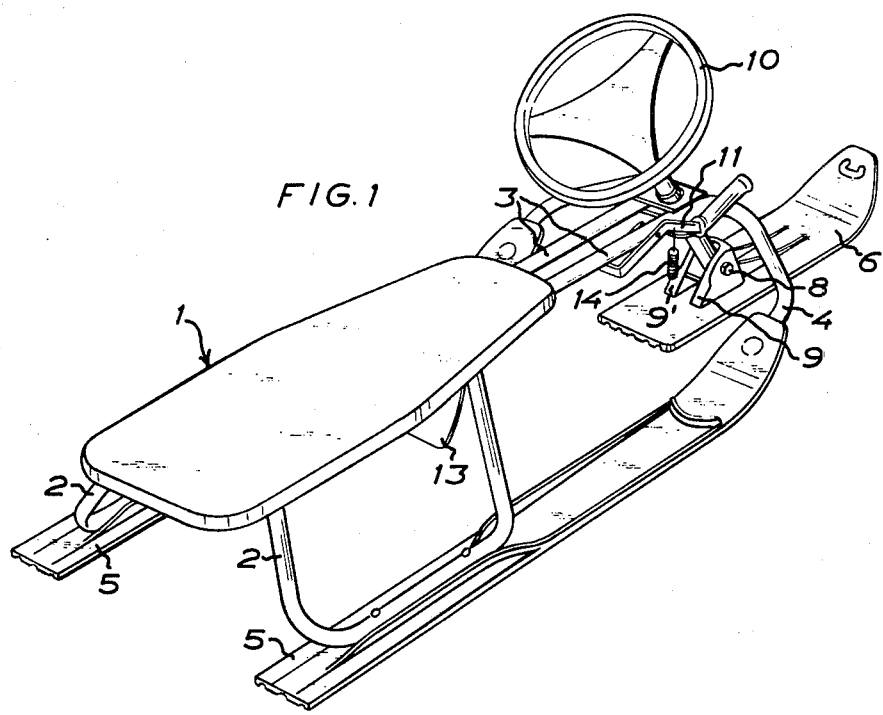
FIG. 1 shows a sled according to the invention in the position it occupies with a rider on its platform and with its steering wheel actuated, the sled being viewed obliquely from the rear.
Figure 2:
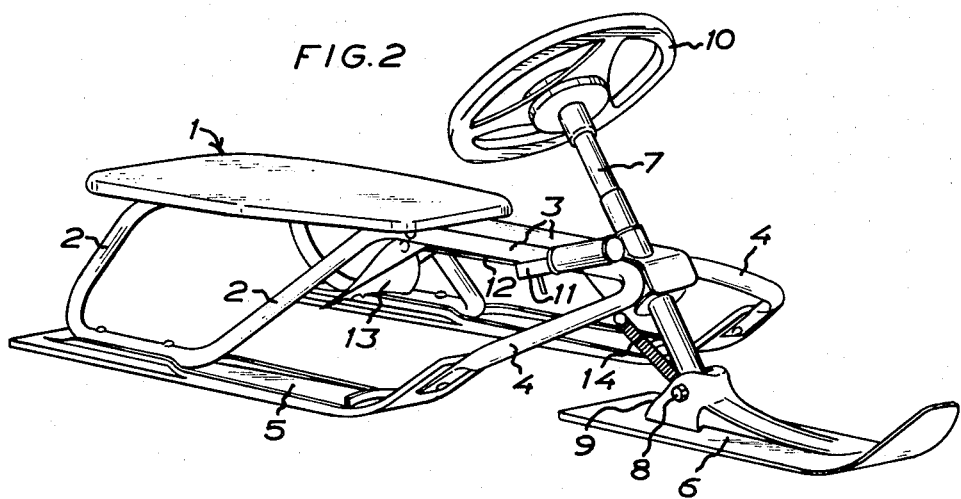
FIG. 2 shows the sled in the same position as in FIG. 1, but viewed obliquely from in front.

The sled is composed of a platform-bearing frame 1 which at the rear has two obliquely outwardly and downwardly directed substantially U-shaped limb portions 2 which merge into two longitudinal portions 3. Each of the latter portions in turn merge into a portion 4 directed obliquely downwardly and rearwardly on either side.

This sled has two fixed sliding planes in the form of runners or skis 5, which are attached to the limb portions 2 and to the obliquely downwardly and rearwardly directed frame portions 4 which serve as deflectors, and a steerable sliding plane in the form of a steering runner or ski 6. The runner 6 is pivoted to a steering rod 7 which in turn is rotatably mounted at the front ends of the longitudinal frame portions 3. At its lower end the steering rod 7 is formed with a transverse bore to receive a pin 8 which also extends through bores in projections 9, 9' disposed at the steering runner so that the runner can pivot about an axis at right angles to the axis of rotation of the steering rod. A steering wheel 10 is fastened to the upper end of the obliquely rearwardly inclined steering rod 7.

A brake lever 11 is pivoted to the frame and connected by means of a rod 12 to a brake member in the form of an arm which can be swung downwards to engage the snow-covered ground and has a substantially bucket-shaped serrated end portion 13.

A steering runner of the type illustrated should be provided with a damping device in order not to oscillate when the sled travels over irregularities of the snow-covered ground. In the embodiment illustrated this damping device is a spring 14, which is interposed between the runner 6 and the hand-brake lever, the spring also serving as a return spring for said lever.

Figure 3:
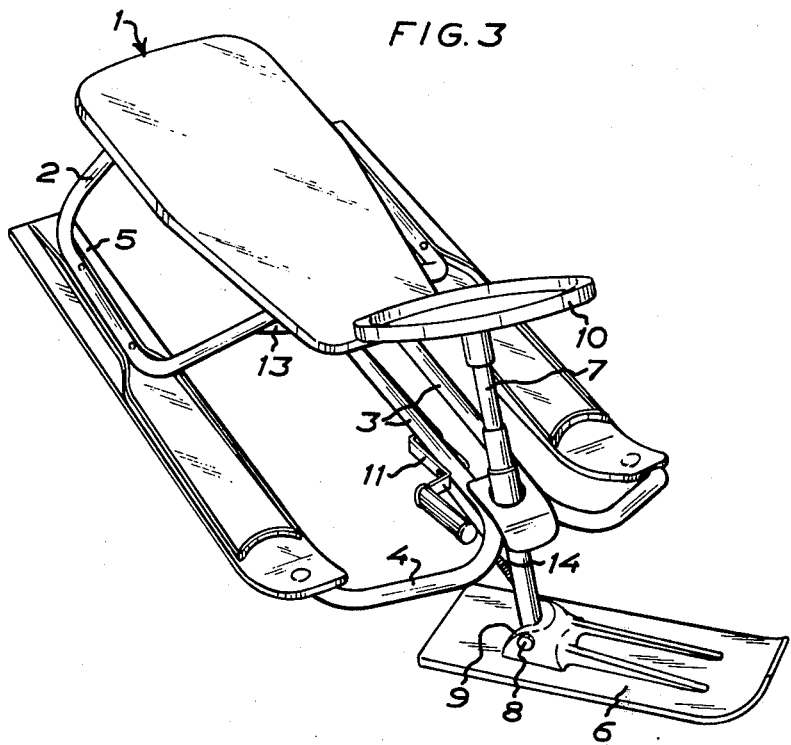
FIG. 3 shows the sled with the front runner in the position it automatically occupies in the non-loaded state of the sled and in the non-actuated state of the steering wheel, the sled being viewed obliquely from in front.

In order to prevent a sled which has lost its rider to continue its straight ahead travel in an uncontrolled manner, the sled according to the invention is so constructed that when the hand wheel is non-actuated the steering runner 6 tends to take an angular position with respect to the longitudinal axis of the sled, and if the sled travels downhill, it will therefore turn and stop in a transverse position with respect to the direction of inclination of the slope. The lower end of the spring 14 is attached to the projection 9' which is disposed on one side of the longitudinal axis of the sled, while the upper end of the spring 14 is attached to the hand-brake lever 11 on the other side of said axis, and as a consequence the spring tending to draw its points of attachment together will turn the steering rod 7 and the runner 6 so that the point of attachment of the spring to the runner will come as close as possible to the opposite spring end, the runner being swung from its straight forwardly directed position, as is shown in FIG. 3.

In the embodiment illustrated the steering runner 6 is of large width and the steering rod 7 is inclined. Upon rotation of the steering rod 7 the runner 6 will therefore turn about its longitudinal axis, and as one edge of said runner is lowered the distance between said edge and the point where the steering rod is mounted will increase. As a consequence, the steering runner will raise the front end of the sled and thus the front ends of the runners 5 rididly connected to the frame portions 4. Steering of the sled is facilitated because of the resulting reduction in length of the portions of the runners 5 which engage the snow-covered ground.

Figure 4:
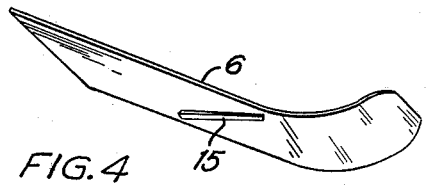
FIG. 4 is a perspective view, viewed obliquely from the front and beneath, of an alternate embodiment of the front runner of the sled.

It should be mentioned that the above solution of the main problem is not the only one possible. Apart from the possibility of arranging springs or like means in several different ways and causing said springs or like means to act upon the steerable sliding plane or steering rod, the front sliding plane or runner may be provided with means engaging the snow-covered ground in such a way that the front runner will take an angular position when the sled travels in an uncontrolled manner. The means in question may be an oblique rib 15 as shown in FIG. 4 disposed at the underside of the sliding plane or runner and having so small a height that it does not in normal coasting harmfully effect the steering of the sled but with non-actuated steering wheel exerts a sufficient steering effect to bring about angular positioning of the steering runner. Moreover, one or more appropriate projections could be arranged at one edge of the sliding plane to produce a braking effect, thus causing the runner to take an angular position. An oblique rib or projection of the type mentioned should be placed in a relatively advanced forward position on the runner to give the best possible effect.

What I claim and desire to secure by Letters Patent is:

1. A sled comprising a frame, a platform mounted on said frame, at least one runner fixed in relation to said frame and having a bottom surface defining the sliding plane of the sled, a steering wheel carrying rod rotatably mounted on said frame and extending upwardly from said sliding plane, at least one steering runner connected to the lower end of said steering wheel carrying rod, and runaway preventing means disposed at and continuously urging said steering runner during operation of the sled to an angular position with respect to the longitudinal direction of the fixed runner, said runaway preventing means being overcome by actuation of said steering wheel during operation of the sled by person riding thereon and displacing said steering runner when said steering wheel is not actuated during operation of the sled.

2. A sled as claimed in claim 1, wherein the means for actuating the pivotally arranged runner is a preferably oblique rib disposed at the sliding surface of said runner and adapted to engage the snow-covered ground, thus causing the runner to take an angular position, said rib having an insignificant extension in width as compared to the width of the runner.

3. A sled as defined in claim 1 wherein said steering rod is inclined upwardly and rearwardly from said sliding plane and wherein said steerable runner is hingedly connected to the lower end of said steering rod for pivotal movement about a hinge pin carried by said steering rod and extending in a transverse direction when said steerable runner is disposed in a fore and aft direction, said hinge pin being inclined upon rotation of said steering rod to thereby incline the steerable runner to the side toward which steering takes place, said at least one fixed runner being rigidly mounted to the foreward portion of said frame.

4. A sled comprising a frame, a platform mounted on said frame, at least one runner fixed in relation to said frame and having a bottom surface defining the sliding plane of the sled, a steering rod rotatably mounted on said frame and extending upwardly from said sliding plane, said steering rod having a steering wheel mounted on its upper end and at least one steerable runner connected to its lower end, and runaway preventing means disposed at and continuously urging said steerable runner to an angular position with respect to the longitudinal direction of said fixed runner during operation of the sled, said runaway preventing means including a spring interposed between said steerable runner and said frame, one end of said spring being attached to the runner at a first point laterally spaced from a plane extending longitudinally of the sled and containing the axis of rotation of said steering rod and having its other end attached to said frame at a second point laterally offset in the direction of said plane from said first point, said spring being overcome by actuation of said steering wheel during operation of the sled and displacing said steerable runner in the absence of actuation of said steering wheel.

5. A sled as defined in claim 4 wherein said steerable runner is hingedly connected to said lower end of said steering rod for movement about a transverse hinge axis, and wherein said spring is connected to said frame and said steerable runner in position to dampen oscillations of said steerable runner about said transverse hinge axis.

6. A sled as claimed in claim 5, further comprising a hand brake, and wherein the spring attachment at the frame of the sled is arranged at a hand-brake lever, the spring acting as a return spring for said hand-brake lever.

7. A sled comprising a frame having a passenger platform mounted thereon, a pair of runners fixed in relation to the frame and having their forward end rigidly connected thereto, at least one steerable runner pivotably mounted on and serving to steer the sled, runaway preventing means disposed at said pivotally mounted runner and continuously tending during operation of the sled to steer said steerable runner to an angular position with respect to the longitudinal axis of said fixed runners, an upwardly and rearwardly inclined steering rod rotatably mounted to the front portion of said frame, means hingedly mounting said steerable runner for pivotal movement about a hinge axis fixed on the lower end of said inclined steering rod, said hinged axis being so located in relation to the axis about which the rotation of the steering rod and steerable runner occurs that upon rotation of the steering rod the steerable runner will be inclined to the side toward which rotation takes place, and manually operable steering control means mounted on the upper end of said steering rod for steering the sled and for overcoming said runaway preventing means during operation of the sled by a passenger riding thereon.

* * * * *